United States Patent [19]
Venable et al.

[11] 3,773,081

[45] Nov. 20, 1973

[54] POWER STEERING GEAR ASSEMBLY

[75] Inventors: Fredrick D. Venable; Raymon L. Goffe, both of Lafayette, Ind.

[73] Assignee: TRW Inc., Cleveland, Ohio

[22] Filed: Sept. 20, 1971

[21] Appl. No.: 182,114

Related U.S. Application Data

[62] Division of Ser. No. 830,275, June 4, 1969, Pat. No. 3,606,819.

[52] U.S. Cl. .......................... 137/625.43, 91/375 A
[51] Int. Cl. ............................................ F16k 11/06
[58] Field of Search .................. 137/625.43, 625.48; 91/375 A

[56] References Cited
UNITED STATES PATENTS

| | | | |
|---|---|---|---|
| 3,145,626 | 8/1964 | Vickers et al. | 137/625.24 X |
| 3,296,939 | 1/1967 | Eddy | 137/625.24 X |
| 3,296,940 | 1/1967 | Eddy et al. | 137/625.24 X |
| 3,433,127 | 3/1969 | Thompson | 91/375 A |
| 2,972,984 | 2/1961 | Heyn et al. | 137/625.48 X |
| 2,988,059 | 6/1961 | Wysong, Jr. | 91/375 A |
| 3,291,002 | 12/1966 | Folkerts | 91/375 A |
| 3,408,900 | 11/1968 | Tomita | 91/375 A |
| 3,465,842 | 9/1969 | Hruska | 91/375 A |
| 2,785,699 | 3/1957 | Creson et al. | 137/625.48 X |

Primary Examiner—Samuel Scott
Attorney—William J. Morris

[57] ABSTRACT

A power steering gear assembly including a centrally bored rack toothed piston dividing a power cylinder in a pair of fluid pressurized chambers, a sector gear meshing with the piston, a valve assembly communicating the pressure chambers with a source of pressurized fluid and including a pair of rotatable valve members nested together in telescopic relation, a centrally bored worm connected to the outer valve member for joint rotation therewith and extending into the bore of and connected to the piston to cause rotation of the worm in response to axial movement of the piston, an operating shaft formed integrally with or connected to the inner valve member for joint rotation therewith and a torsion rod providing follow-up movements between the valve members, the torsion rod extending into the bore of the worm, which worm bore in turn communicates certain axial slots formed in the outer valve member with the pressure chamber spaced farthest therefrom, other axial slots formed in the outer valve member opening directly to the pressure chamber immediately adjacent the valve assembly and fluid inlet and outlet ports communicating with the axial slots through the inner valve member.

2 Claims, 5 Drawing Figures

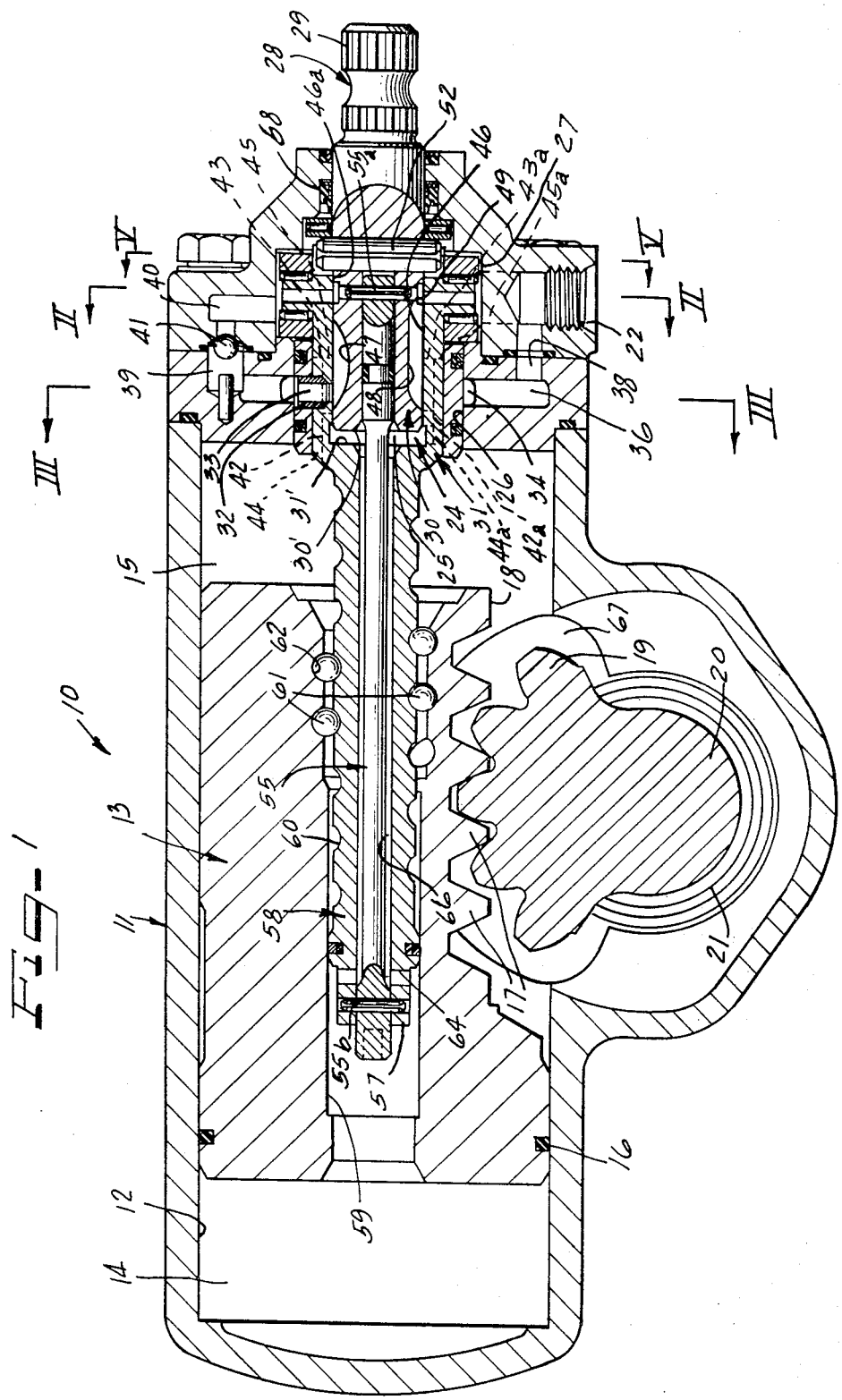

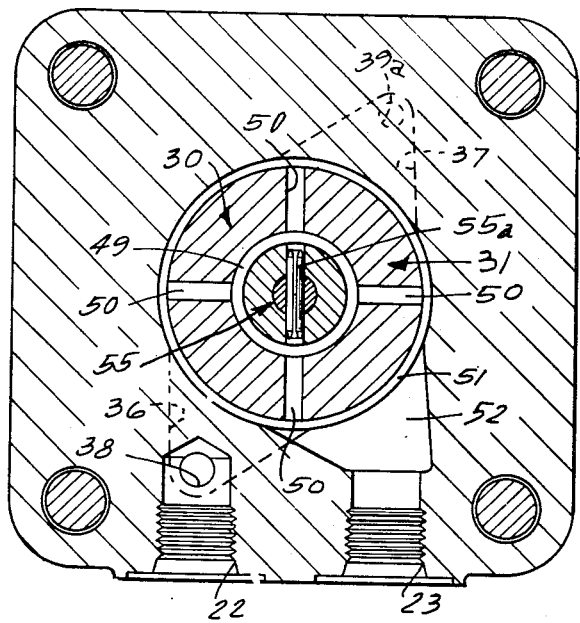
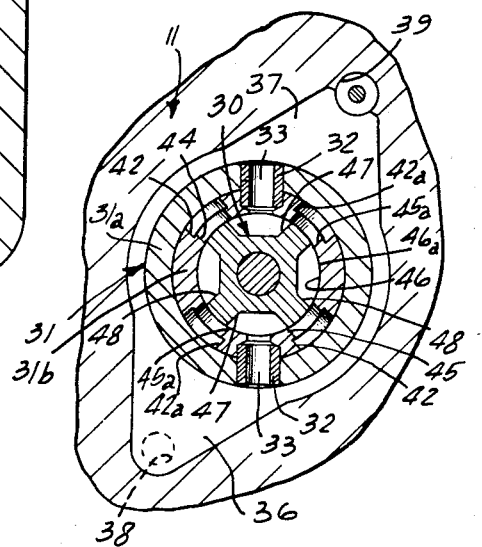
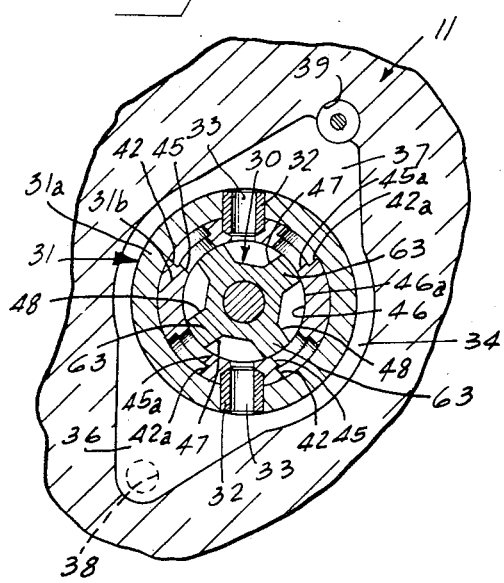
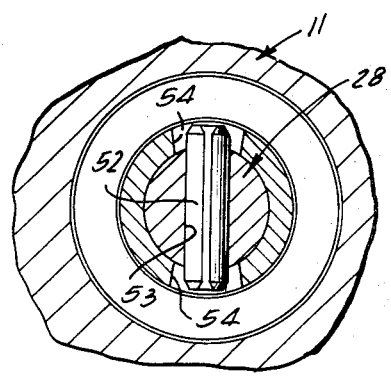

POWER STEERING GEAR ASSEMBLY

This application is a Division of Ser. No. 830,275, filed June 4, 1969, and now U.S. Pat. No. 3,606819 issued Sept. 21, 1971.

BACKGROUND OF THE INVENTION

The present invention relates generally to the field of pressurized fluid operated servo mechanisms and more particularly to an integral power steering gear assembly for use in controlling the steering angle of the dirigible wheels of a vehicle.

Known power steering gear assemblies of this general description often include a housing forming a power cylinder, a piston in the cylinder having a series of rack teeth formed thereon and a shaft mounted sector gear meshing with the rack teeth of the piston, the shaft upon which the sector gear is mounted being connected to a pitman arm outside the housing for actuating the mechanical steering linkage of the dirigible wheels.

The housing further comprises a fluid inlet port and a fluid outlet port adapted for connection to the suction and discharge sides of a main power fluid pump assembly. A valve assembly including a pair of relatively rotatable valve members within the housing controls the flow of fluid to and from the opposite ends of the power cylinder to control movement of the piston. One of the valve members is formed integrally with a manually actuated operating shaft adapted to receive a steering wheel or the like to operate as control lever. A valve follow-up member is connected to the other valve member and to the piston. By virtue of this arrangement movement of the piston is under the control of the operating shaft, as will be understood by those skilled in the art.

The follow-up member may assume the form of a worm extending into a bore formed in the piston and mechanically connected thereto in a manner to cause rotation of the worm in response to axial movement of the piston. A valve centering device may comprise a torsion rod directly or indirectly interconnecting the rotary valve members to bias them to a mutually neutral position after movement of the operating shaft has ceased.

The present invention relates to an improved power steering gear assembly of this general description which is more compact than prior art systems (compactness being an important consideration in the application and utilization of such systems in vehicular steering), is more efficient, can be constructed and assembled with great economy and is capable of serving a greater useful operating life with greater precision in steering.

SUMMARY OF THE INVENTION

The present invention may be summarized as comprising a power steering gear assembly in which the worm is axially apertured and the centering device comprises an elongated torsion rod housed within the bore of the worm. As a consequence the overall assembly is substantially reduced in size and the ability to vary steering effort levels is increased as a consequence of the lengthening of the torsion rod. Furthermore the aperture in the worm is utilized as a fluid flow passage in directing fluid to and from the far end of the power cylinder.

The valve assembly which controls the flow of fluid into and out of the pressure chambers of the power cylinder comprises a pair of rotary valve members telescoped or nested one within the other with the inner valve member being connected fast to or formed integrally with a manually actuated operating shaft as well as to an inner end of the torsion rod and the outer valve member connected fast to the worm and hence indirectly to the outer end of the torsion rod. The valve members are so constructed and arranged to simplify the manufacture and assembly thereof and to enhance the precision sensitivity and steerability of the power steering gear assembly.

In addition to the improved performance characteristics and compactness of the power steering gear assembly of the present invention the rotary valve members are designed to increase overall operating efficiency by reducing internal leakage as a result of the reduced diameter of the rotary valve members. Furthermore the inventive concepts embodied in the valve members provide highly sensitive steering capability while requiring only simple machining operations in the construction thereof and obviating high machining tolerances.

In addition a short valve sleeve to body relationship provides conical and eccentricity alignment thereby avoiding the usual problems normally present with "three bearing shafts." Furthermore the only positive dynamic sealing member within the housing is exposed only to low pressure. Other high pressure seals are low leakage type with extremely low friction provided by elastromeric backed teflon for a low friction condition at high differential pressures.

Objects of the present invention are, therefore, to reduce the overall size and increase the compactness of the power steering gear assembly, to improve the performance characteristics thereof, to simplify the design and construction thereof, to reduce the cost of manufacuture thereof and to improve the steering precision and "feel" thereof.

Other objects, features and advantages of the invention will be readily apparent from the following description of a preferred embodiment thereof, taken in conjunction with the accompanying drawing, although variations and modifications may be effected without departing from the spirit and the scope of the novel concepts of the disclosure.

BRIEF DESCRIPTION OF THE DRAWING

FIG. 1 is a longitudinal cross-sectional view of a power steering gear assembly constructed in accordance with the principles of the present invention.

FIG. 2 is a transverse cross-sectional view taken along the lines II—II of FIG. 1.

FIG. 3 is a partial transverse cross-sectional view taken along lines III—III of FIG. 1.

FIG. 4 is similar to FIG. 3 but discloses the sleeve valves in different positions relative to one another.

FIG. 5 is another partial transverse cross-sectional view but is taken along line V—V of FIG. 1.

DESCRIPTION OF THE PREFERRED EMBODIMENT

The principles of the present invention are of utility in a wide variety of fluid operated servomechanisms but find particular utility in servomechanisms employing an axially shiftable rack-toothed piston and a gear mounted on a rotatable shaft meshing with the teeth of the piston.

Since the present invention also finds particular utility in vehicular power steering systems the embodiment disclosed herein is described in its relation to power steering systems. It should be understood throughout, however, that the invention is denominated a "power steering" gear assembly for convenience in description and not to connote inutility in other applications.

Referring to the drawings a power steering gear assembly constructed in accordance with the principles of the present invention is indicated generally at reference numeral 10. The assembly 10 comprises a housing 11 having an internal cylindrical wall 12 forming a power cylinder in which is carried for reciprocable sliding motion a piston 13. The piston 13 partitions the power cylinder 12 into a pair of fluid pressure chambers 14 and 15 referred to respectively from time to time hereinafter as the far or outboard pressure chamber and the near or inboard pressure chamber. A sealing member 16 is mounted on the piston 13 to provide a fluid seal between the pressure chambers 14 and 15.

A series of rack teeth 17 are formed along one side 18 of the piston 13 to engage in meshing relation with teeth 19 formed on a sector gear 20. The gear 20 is mounted fast on a cross shaft 21 which projects outwardly through a side wall of the housing 11. In vehicular steering applications the cross shaft 21 may conveniently connect to a pitman arm through which the mechanical steering linkage is actuated. Thus as the piston 13 moves back and forth in the power cylinder 12 the sector gear 20 and the cross shaft 21 are rotated accordingly to operate the steering linkage as will be understood by those skilled in the art.

Also formed in the housing 11 is a fluid inlet port 22 and a fluid outlet port 23 which are adapted for connection to suitable hydraulic circuitry including a main fluid power pump assembly. The flow of fluid is directed to and from the pressure chambers 14 and 15 by means of a valve assembly indicated generally at reference numeral 24 portions of which are housed within a chamber 25 defined in part by a reduced diameter cylindrical bore wall 26 and an increased diameter bore wall 27. The valve assembly 24 is actuated by means of a manually operated shaft 28 journalled for rotation in the housing 11 and having an outer end 29 thereof splined to receive a steering wheel or the like lever to facilitate rotation thereof.

The valve assembly 24 may be more particularly characterized as comprising a pair of rotary valve members 30 and 31 telescoped or nested concentrically one within the other and journalled for rotation within the bore walls 26 and 27 relative to the housing 11 and relative to one another. In the illustrated embodiment the outer valve member 31 comprises a value sleeve including a pair of valve elements 31a and 31b pinned together for joint rotation as at reference numerals 32. This two-piece arrangement is for convenience in manufacture and the two components 31a and 31b are considered for purposes herein as a single valve sleeve 31.

The pins 32 are apertured as at 33 and open to a circumferentially continuous groove 34 formed in the bore wall 26 and having a pair of substantially diametrically opposed enlarged portions 36 and 37 which serve as fluid flow passageways. The lower portion 36 communicates with an axial flow passageway 38 to the fluid inlet port 32 and the upper portion 37 communicates through an axial passage 39 with a fluid chamber 40, a ball check 41 being disposed in the passage 39.

Formed in the outer valve member 31 are a pair of angularly spaced axially extending slots 42 each of which is closed at one end 43 and which opens at another end 44 to the inboard or near pressure chamber 15. Another pair of axially extending slots 42a, disposed respectively between pairs of the slots 42, are closed at a rear end 43a and open at an opposite end 44a into the chamber 25 between an outer end wall 30' of the inner valve member 30 and an inner end wall 31' of the valve sleeve 31. In addition the slots 42 and 42a are in open communication with radially extending apertures 45 and 45a opening to an inner wall 46 of the outer sleeve valve 31.

The inner sleeve member 30 is rotatable within the inner wall 46 and has formed in the peripheral wall 46a thereof a series of axially extending circumferentially spaced grooves indicated at reference numerals 47 and 48. Although the two grooves 47, 47 are diametrically opposed with respect to the axis of the inner valve member 30 the cross-sectional view of FIG. 1 shows one groove 47 and one groove 48 in section merely to illustrate the relative configurative relationship between the two. FIG. 1 is therefore not a true diametrical cross-sectional view with respect to the valve assembly 24.

As shown in FIG. 1 grooves 47 are axially elongated sufficiently to communicate the apertures 33 of pins 32 with the radial apertures 45 while grooves 48 are sufficiently axially elongated to communicate radial apertures 45a with an annular groove 49 extending circumferentially continuously about the inner sleeve valve peripheral wall 46a. The groove 49 in turn communicates through a series of radial passages 50 with an annular groove 51 communicating with an enlarged flow passageway 52 in fluid conducting relation with the fluid outlet port 23. It is noted that the chamber 40 is also in fluid communication with the fluid outlet port 23 via the annular groove 51.

As mentioned, the inner valve member 30 may be formed integrally with the operating shaft 28 and in any event is connected for joint rotation therewith. Thus the rotation of the inner valve member 30 is directly controlled by the operating shaft 28.

On the other hand the outer valve member or sleeve 31 is connected to the operating shaft 28 for limited relative rotation by virtue of a pair of driving pins 52 disposed in a transverse bore 53 formed in the operating shaft 28 and projecting at opposite ends into a pair of radially angularly oversized slots 54 formed in the valve sleeve 31. It will thus be appreciated that the operating shaft 28 may rotate through a predetermined angle without effecting rotation of the valve sleeve 31, but thereafter the ends of the driving pins 52 abut the side walls of the slots 54 to cause direct rotation of the valve sleeve 31 in response to further rotation of the operating shaft 28.

FIG. 3 discloses the relative disposition of the inner and outer valve members 30 and 31 when the same are disposed in a neutral or non-operating position. The valve members 30 and 31 are biased to said neutral position by means of a torsion rod 55 which is pinned at an inner end 55a to the inner valve member 30 for joint rotation therewith and is pinned at an outer end 55b for joint rotation with the outer end 57 of a worm 58 formed integrally with and extending from the inner component 31b of the valve sleeve 31. The worm 58 is disposed in an axial bore 59 formed in the piston 13 and is helically grooved as at 60 to receive a plurality of ball bearings of the like as at 61 shaped complementarily to a helical groove 62 formed in the bore wall 59 of the piston 13. As a result of helical grooves 60 and 62 and the driving balls 61 residing therein the worm 58 is caused to rotate as the piston 13 shifts axially in a manner understood by those skilled in the art.

OPERATION

During operation when, for example, the power steering system 10 is mounted on a vehicle to control the steering of the dirigible wheels thereof, the inlet and outlet fluid ports 22 and 23 are connected respectively to the discharge and suction sides of the main fluid pump assembly. With the operation shaft 28 in a static condition the inner and outer valve members 30 and 31 are disposed in the neutral position shown in FIG. 3. In that position of the valve member 30 and 31 the pressurized fluid enters the inlet port 22 and passes through passages 38 and 36 to the groove 34 surrounding the valve sleeve 31. From groove 34 the pressurized fluid flows through apertures 33 formed in the pins 32 and thence to the grooves 47, 47 of the inner valve member 30.

The radially angular dimensions of land portions 63 which separate grooves 47 and 48 are less than the corresponding dimension of the ports 45 and 45a formed in the inner wall 46 of the outer sleeve valve 31. Thus the pressurized fluid flows into grooves 47 and is therefore in communication with pressure chamber 15 of the power cylinder 12 via the axial slots 42. On the other hand pressure chamber 14 is also in communication with pressurized fluid via the bore 59 formed in the piston 13, a transverse bore 64 formed in the worm 58, an oversized axial bore 66 in which the torsion rod 55 is housed and the slots 42a of the valve sleeve 31, which communicate in turn with the axial grooves 46, the circumferential groove 49, radial passages 50 and the fluid outlet port 23. Since both the grooves 47 and 48 therefore communicate with both the fluid inlet and outlet ports 22 and 23 the pressure in both chambers 14 and 15 is equal and the piston 13 remains in a static state.

Thus when the operating shaft 28 is not moving the pressure in chambers 14 and 15 is equalized thereby precluding axial shifting of the piston 13 and rotation of the sector gear 20.

Assume now that the operating shaft 28 is continuously rotated in a clockwise direction, thereby rotating the inner valve member 30 relative to the valve sleeve 31 to the position thereof shown in FIG. 4. Now grooves 47, 47 of the inner member 30 communicate with the pressurized fluid but grooves 48, 48 do not. The low pressure or return fluid outlet port 23 communicates with pressure chamber 15 through axial slots 42, axial grooves 48, circumferential groove 49. radial passages 50 and passage 52.

Pressure chamber 14 of the power cylinder 12 communicates with the high pressure fluid inlet port 22 through bore 59 of the piston 13, bores 64 and 66 of the worm 58, the valve chamber 25, axial slots 42a formed in the valve sleeve 31, axial grooves 47 formed in the inner valve member 30, the hollow pins 32, the annular groove 34, the axial passage 38 and to the fluid inlet port 22.

The piston 13, because of the pressure differential thereacross, moves rightwardly in the power cylinder 12 and is held against rotation about its longitudinal axes by virtue of a flat non-rotation flange 67 mounted on the cross shaft 21 and engaged in abutting relation with flattened side walls of the rack teeth 17. This rightward movement of the piston 13 causes the worm 58 to be rotated by virtue of the grooves 60 and 62 and the balls 62 in a direction corresponding to the direction of rotation of the operating shaft 28.

Rotation of the worm 58 causes the valve sleeve 31 to rotate correspondingly while maintaining the same radially angularly offset relation to the inner valve member 30 shown in FIG. 4. Thus while the operating shaft 28 continues to rotate the inner valve member 30 also rotates and the valve sleeve 31 "follows" the inner valve member 30 while maintaining the angular displacement therewith.

When the operating shaft 28 again comes to rest rotation of the valve member 30 immediately ceases. Pressurized fluid from the inlet port 22 is, however, still in communication with the pressure chamber 14 and thus the piston 13 continues to move rightwardly until such movement has rotated the worm 58 and the valve member 30 to the neutral positions thereof as shown in FIG. 3. The fluid pressure in chambers 14 and 15 is then equalized and axial movement of the piston 15 and rotation of the sector gear 20 ceases.

Rotation of the operating shaft 28 in an opposite direction causes the pressurized fluid to flow in an opposite direction through the power steering gear assembly 10 whereby the pressure chamber 15 is subjected to the high pressure fluid and chamber 14 is subjected to the lower pressure fluid. The pressure differential to which the piston 13 is then subjected has the effect of moving the piston leftwardly as viewed in FIG. 1 and of turning the sector gear 20 accordingly.

The ball check 41 normally closes off passage 39 to prevent the high pressure fluid from flowing into chamber 40. In the event that a sudden shock force is applied to the piston 13 through the sector gear 20, however, causing a substantial increase in the fluid pressure in chamber 40 the ball check 41 will move off its seat to permit fluid leakage therethrough, thus momentarily equalizing the fluid pressure across the piston 13. The ball check 41 functions, therefore, as a safety relief valve.

A seal member 68 surrounds the operating shaft 28 and constitues the only positive dynamic sealing member utilized in the power steering system 10. The sealing member 68 is subjected only to low pressure fluid under all operating conditions of the system 10. Other sealing members, such as the seal 16, are of the low-friction, low-leakage type and may comprise elastomeric backed teflon rings.

In the event of failure of the main power fluid supply pump the power steering gear assembly 10 will be operated to steer the dirigible wheels. In that event rotation of the operating shaft 28 will cause the pins 52 (FIGS. 1 and 5) to engage the abutment walls of the grooves 54 formed in the valve sleeve 31. The hydraulic circuitry through the gear assembly 10 is open by virtue of the angular displacement of the inner and outer valve members 30 and 31. Thus rotation of the operating shaft 28 during manual operation has the effect of rotating the worm 58 correspondingly, which in turn effects axial shifting of the piston 13 and rotation of the sector gear 20.

We claim:

1. A generally cylindrically shaped valve sleeve for use in combination with a cooperating valve member for performing a valving function.

said valve sleeve having formed therein a fluid flow passage a portion of which extends in an axial direction, and comprising a plurality of separately formed valve elements secured together in fixed assembly effectively to provide a unitary operating structure having a plurality of walls including an inner peripheral wall, an outer peripheral wall and a pair of end walls, said valve elements having contiguous axially overlapping wall surfaces and recess means formed in at least one of said wall surfaces to provide said axially extending portion of said fluid flow passage, said passage terminating at one end at said inner peripheral wall and at the opposite end at one of said end walls.

2. The invention as defined in claim 1 wherein said valve elements are concentrically arranged and said fluid flow passage is disposed wholly within the inner valve element.

* * * * *